United States Patent
Lin

(10) Patent No.: US 7,385,941 B2
(45) Date of Patent: Jun. 10, 2008

(54) POWER SAVING CONTROL METHOD FOR A WIRELESS COMMUNICATION MODULE

(75) Inventor: Tzu-Wen Lin, Sanchong (TW)

(73) Assignee: Mitac International Corp., Taoyuan (TW)

(*) Notice: Subject to any disclaimer, the term of this patent is extended or adjusted under 35 U.S.C. 154(b) by 598 days.

(21) Appl. No.: 11/007,275

(22) Filed: Dec. 9, 2004

(65) Prior Publication Data

US 2005/0130714 A1    Jun. 16, 2005

(30) Foreign Application Priority Data

Dec. 12, 2003    (TW) .............................. 92135147 A

(51) Int. Cl.
*G08C 17/00*    (2006.01)

(52) U.S. Cl. ................. 370/311; 455/343.1; 455/343.2; 455/343.5

(58) Field of Classification Search ............. 455/343.1, 455/343.2, 343.5; 375/316, 318, 219; 370/311
See application file for complete search history.

(56) References Cited

U.S. PATENT DOCUMENTS

| | | | |
|---|---|---|---|
| 7,200,186 B2 * | 4/2007 | Schoenborn | 375/316 |
| 2002/0132603 A1 * | 9/2002 | Lindskog et al. | 455/343 |
| 2005/0202798 A1 * | 9/2005 | Kurz | 455/343.1 |
| 2006/0112289 A1 * | 5/2006 | Chang | 713/300 |

FOREIGN PATENT DOCUMENTS

JP    2003143057 A  *  5/2003

* cited by examiner

*Primary Examiner*—Sujatha Sharma
(74) *Attorney, Agent, or Firm*—Bacon & Thomas, PLLC

(57) ABSTRACT

A power saving control method for an electronic communication device having a wireless communication module and a control software is provided. The control software includes at least a detection mode and executes the steps of detecting the action of the wireless communication module and obtaining a result. The power supply status of the wireless communication module is controlled via the control software according to the obtained result, thereby preventing waste of electricity.

5 Claims, 5 Drawing Sheets

POWER SAVING CONTROL METHOD FOR A WIRELESS COMMUNICATION MODULE

FIELD OF THE INVENTION

The present invention relates to a power saving method, more particularly to a power saving control method for a wireless communication module by detecting the action status of the wireless communication module and controlling power supply of the wireless communication module according to the detected result, thereby preventing waste of electricity.

BACKGROUND OF THE INVENTION

The recent prosperity in electronics and communication industries has brought computer network into all kinds of places, such as in family, in school and in business. The computer network has eliminated the limitation of spatial separation and largely changed the style of communication between people. Since portable electronic products, such as a laptop computer, personal digital assistant, have also gained their popularity. The user of these electronic products not only needs a high speed network connection, but also needs to get access to the network anywhere without looking for a network socket to plug in. Therefore, wireless local area network is developed.

Wireless local area network (WLAN) performs local wireless network connection by using a wireless network module, such as a wireless card or a PCMCIA card in combination with a wireless access point to transmit and receive wireless data signals and connect to the Internet via the wireless access point. One can thus get access to the Internet resources.

Wireless broadband network service has become very popular worldwide. Many international airports, hotels, coffee shops provide similar services. The user is required to bring in his/her own portable electronic products (e.g. laptop computer or personal digital assistant), which include a wireless card, to get wireless access to the Internet by entering the account name and password acquired from the network service supplier. Such wireless network service has the following advantages.

1. The computer can get connected to the network without being restricted to certain network wiring scheme.
2. The wireless network connection does not require any compliance of wiring and socket specification, which can save a lot of time and man power in network installation.
3. According to the IEEE802.11b standard, the wireless access point can provide a transmission speed up to 11 Mbps, which is roughly 200 times faster than a 56 Kbps modem. This speed can satisfy most of the everyday file transmission requirement.
4. New users are easily added to the network without considering the limited number of access points in conventional wired network.

Due to the advantages set forth above, Intel Corporation developed a Centrino® mobile processor. The mobile processor includes a Pentium-M processor, an 802.11b wireless module and an 855 chipset. This mobile processor is primarily used in laptop computers, such that the computer can easily be connected to a wireless access point and the network without using an external PCMCIA wireless network card. This can largely enhance the capacity of the laptop computer. Nevertheless, most of the computers now still require a wireless network card or a built-in 802.11b wireless module on the motherboard in order to get access to the wireless access point and the network.

However, wireless communication modules are often enabled when starting up electronic communication devices. The wireless communication module can then search and detect for available wireless channels. If the user forgets to turn off the wireless communication module, the wireless communication module will continuously search and detect for available wireless channels. In this manner, the wireless communication module will continuously radiate electromagnetic waves, which is a great waste of electricity and very likely to bring high risk to the health of the user. Therefore, it is desirable to develop a wireless communication module that can be turned on or off in proper timing or during a certain period of time.

SUMMARY OF THE INVENTION

In light of the above, a power saving control method of a wireless communication module of the present invention is developed.

Therefore, one objective of the present invention is to include a detection procedure within certain control software. The detection procedure comprises at least a detection mode. The detection mode can detect the action status of a wireless communication module, so as to control the power supply of the wireless communication module according the detected result, thereby preventing waste of electricity.

DETAILED DESCRIPTION OF THE PREFERRED EMBODIMENTS

Figure 1:
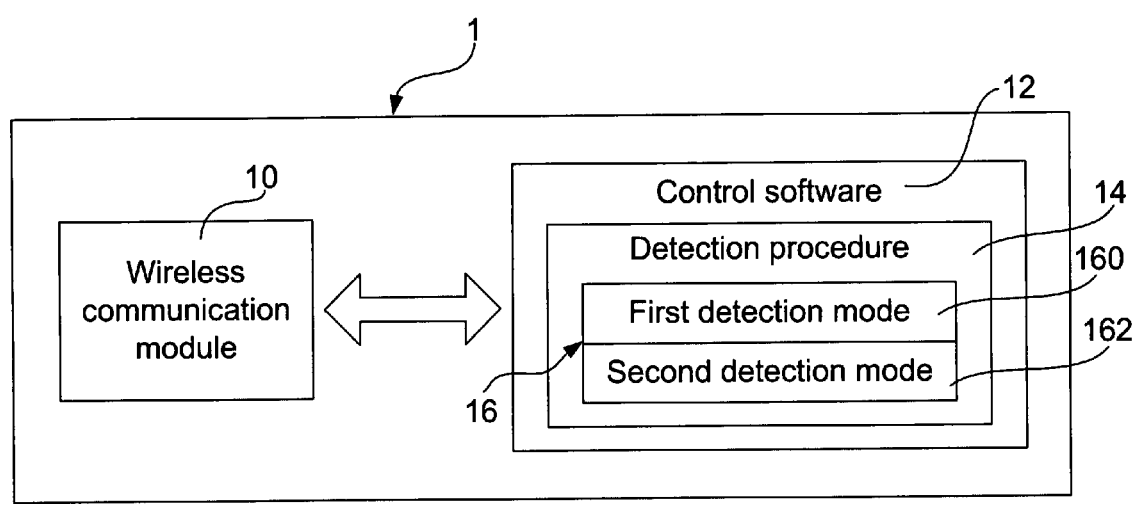
FIG. 1 is a block diagram of an electronic communication device of the present invention.

Referring to FIG. 1, an electronic communication device of the present invention is illustrated. The electronic communication device 1 comprises a wireless communication module 10 and control software 12, wherein the control software 12 comprises a detection procedure 14, and the detection procedure 14 comprises at least a detection mode 16. The control software 12 can detect the status of the wireless communication module 10 via the detection mode 16 and return a detection result. The control software 12 can control the power supply status of the wireless communication module 10 according to the detected result, so as to prevent unnecessary power consumption of the electronic communication device 1 and to prevent unnecessary electromagnetic radiation from the wireless communication module 10. Furthermore, the wireless communication module 10 can be powered on or off properly to respond the actual need, thereby extending the life cycle of the wireless communication module 10.

Figure 2:
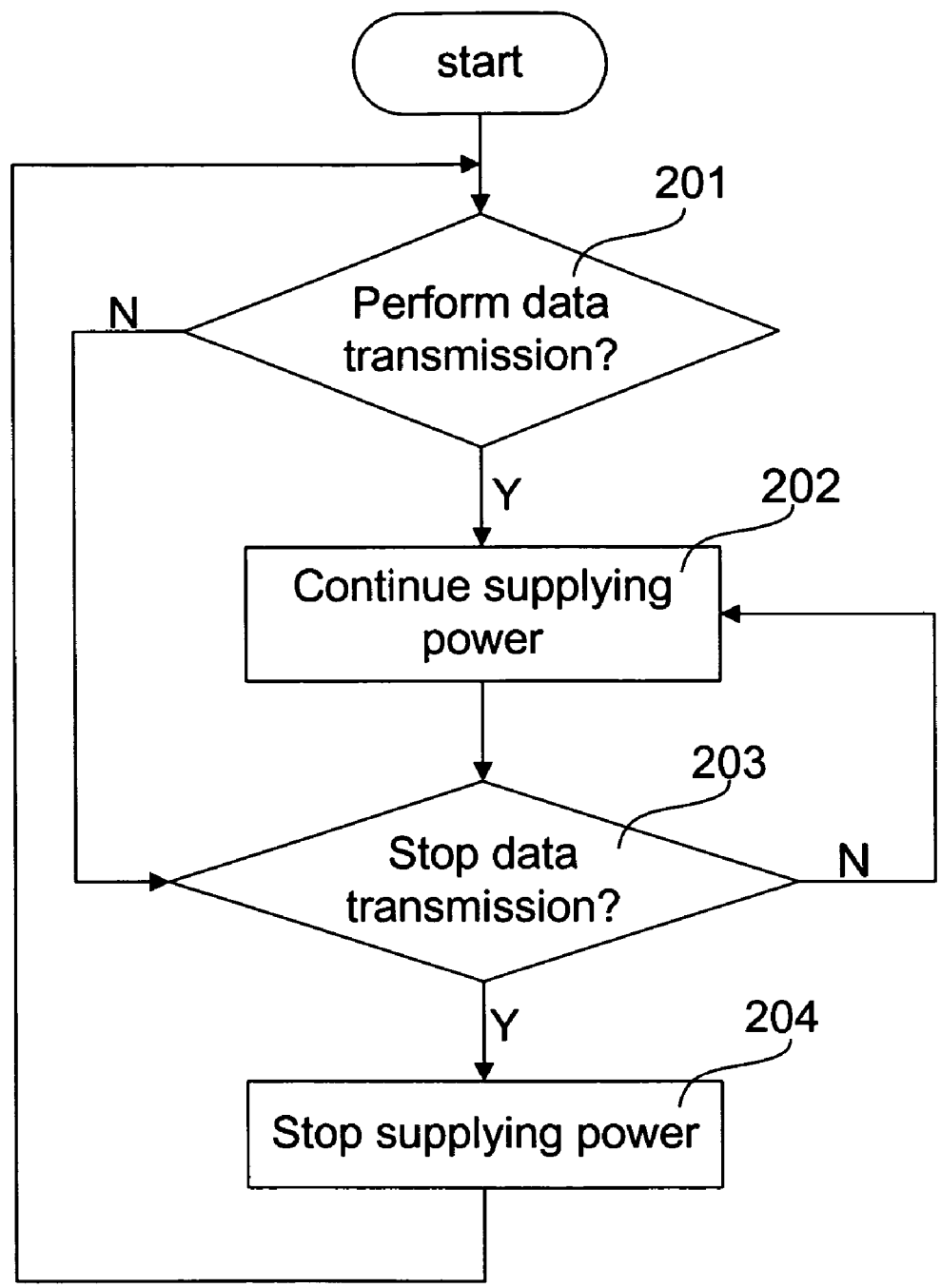
FIG. 2 is a flow diagram illustrating the wireless communication module of the present invention working under a first detection mode.

Referring to FIG. 2, one preferred embodiment of the present invention is illustrated. As shown, the first detection mode 160 of the detection procedure 14 is configured to detect whether the wireless communication module 10 is transmitting data. After the electronic communication device 1 is powered on, the control software 12 will control the power supply status of the wireless communication module 10 according to the following steps.

First, in step 201, the first detection mode 160 is employed to detect whether the wireless communication module 10 is performing data transmission. If the wireless communication module 10 is performing data transmission. Then either step 202 or step 203 is proceeded.

In step 202, the control software 12 continuously supplies power to the wireless communication module 10 while the wireless communication module 10 is transmitting data, and then step 203 is proceeded.

In step 203, the first detection mode 160 determines again whether the wireless communication module 10 stops transmitting data. If the wireless communication module 10 has stopped transmitting data, then either step 204 or step 202 is proceeded.

In step 204, the control software 12 stops supplying power to the wireless communication module 10, then step 201 is proceeded.

Figure 3:
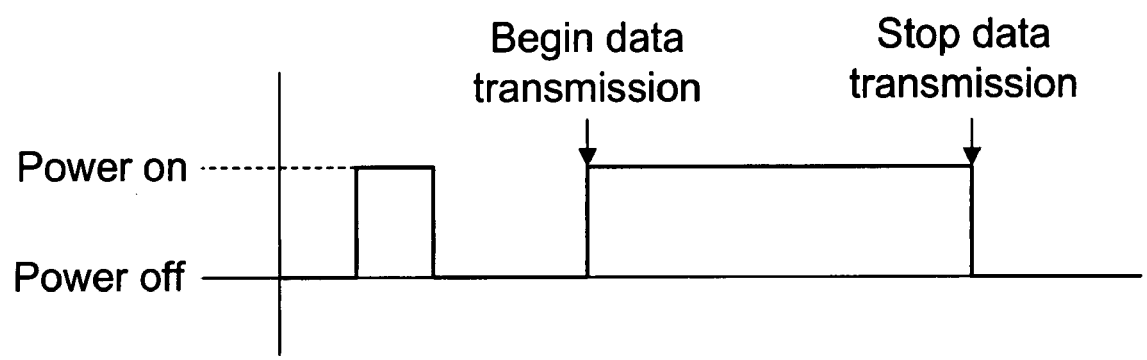
FIG. 3 is a schematic diagram illustrating the status of power supply of the wireless communication module of the present invention working under the first detection mode.

According to the above, the control software 12 only supplies power when the wireless communication module 10 is transmitting data, as shown in FIG. 3. In this manner, the wireless communication module 10 will not consume extra power while not transmitting any data. Furthermore, the number of actions of the wireless communication module 10 can be reduced, which can lower the risk of components damages of the wireless communication module 10, thereby rendering the wireless communication module 10 to have a longer life cycle.

Figure 4:
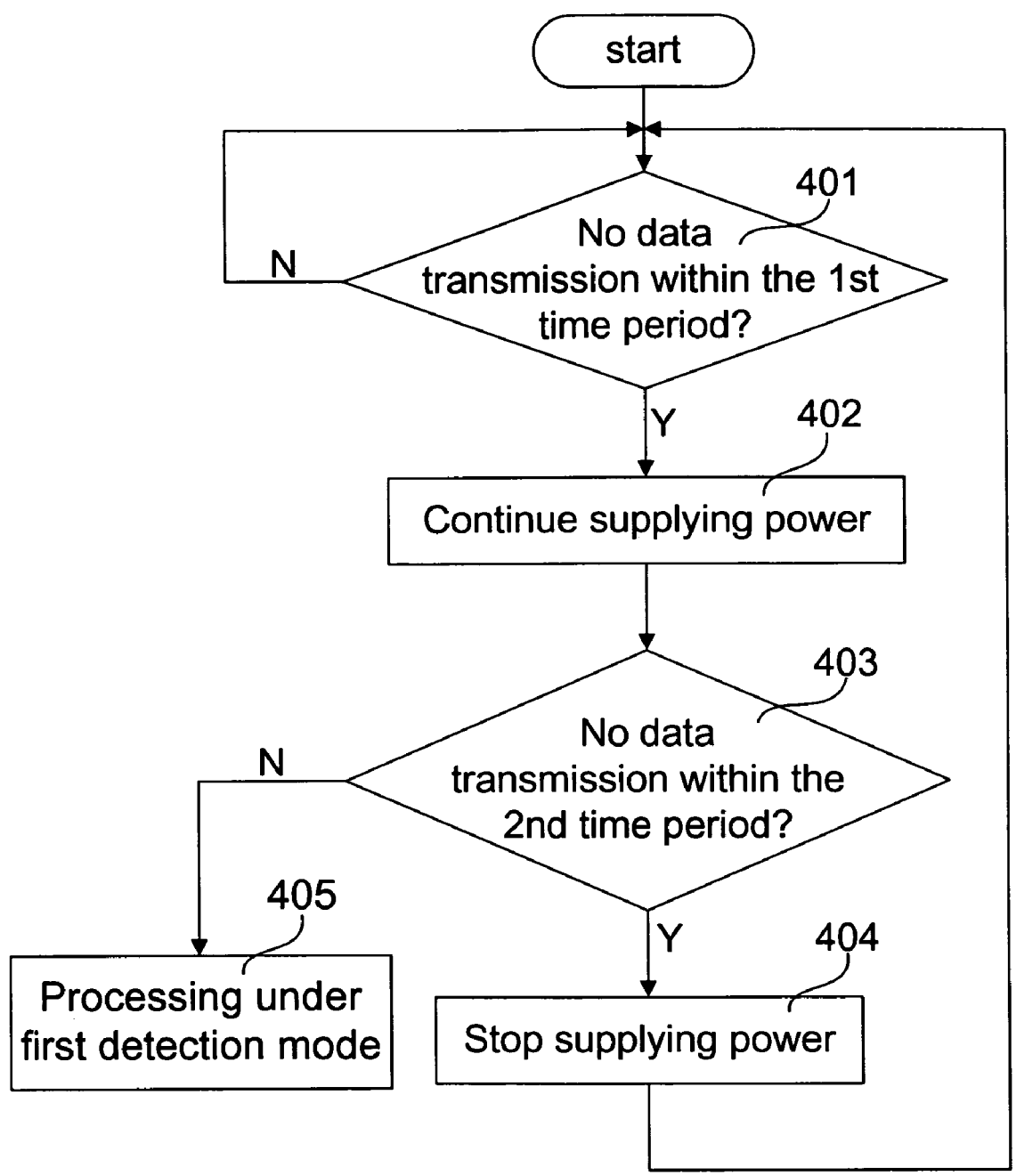
FIG. 4 is a flow diagram illustrating the wireless communication module of the present invention working under a second detection mode.

Referring to FIG. 4, the second detection mode 162 of the detection procedure 14 comprises a first time period and a second time period configured therein. The second detection mode 162 is configured to detect whether the wireless communication module 10 does not perform any data transmission during the first time period, such that the second detection mode 162 can determine whether the wireless communication module 10 has stopped transmitting data. The control software 12 controls the power supply status of the wireless communication module 10 according to the following steps.

First, in step 401, the second detection mode 162 detects whether the wireless communication module 10 does not perform any data transmission during the first time period. If positive, either step 402 or step 401 is proceeded.

In step 402, the control software 12 supplies power to the wireless communication module 10, such that the wireless communication module 10 can start detecting and searching available channels within certain range.

Later, in step 403, the second detection mode 162 detects whether the wireless communication module 10 does not transmit any data during the second time period. If positive, either step 404 or step 405 is proceeded.

In step 404, the control software stops supplying power to the wireless communication module 10, and then step 401 is proceeded.

In step 405, the control software processes in accordance with the first detection mode 160.

Figure 5:
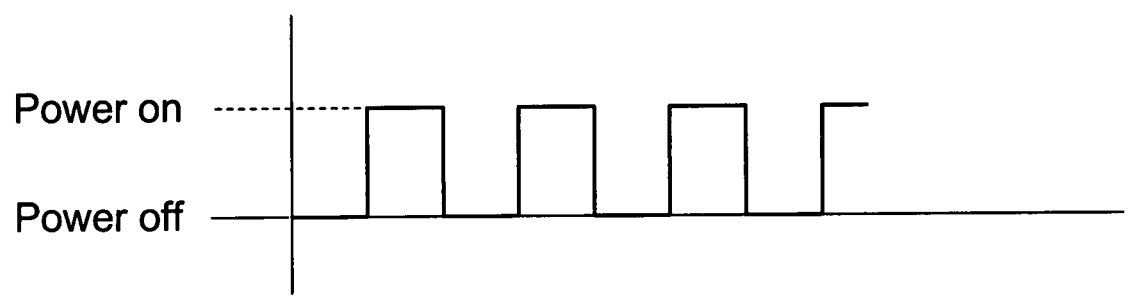
FIG. 5 is a schematic diagram illustrating the status of power supply of the wireless communication module of the present invention working under the second detection mode.

According to the steps as set forth above, the control software 12 continuously powers on and off the wireless communication module 10, as shown in FIG. 5. Therefore, the wireless communication module 10 can transmit and receive data without unnecessarily consuming too much power.

While the invention has been described by means of specific embodiments, numerous modifications and variations could be made thereto by those skilled in the art without departing from the scope and spirit of the invention set forth in the claims.

What is claimed is:

1. A power saving control method for a wireless communication module installed in an electronic communication device comprising the wireless communication module and a control software, wherein the control software comprises a first detection mode and a second detection mode, the method comprising the steps of:
   detecting whether the wireless communication module is transmitting data by using the first detection mode and whether the wireless communication module has stopped transmitting data during a first time period by using the second detection mode;
   obtaining a result; and
   controlling the power supply status of the wireless communication module according to the obtained result.

2. The method of claim 1, wherein the control software controls the power supply status of the wireless communication module according to the following step:
   when the first detection mode detects that the wireless communication module is transmitting data, then continuously supplying power to the wireless communication module by using the control software during the data transmission of the wireless communication module.

3. The method of claim 1, further comprising the steps of:
   the first detection mode detecting whether the wireless communication module has stopped transmitting data while the control software is continuously supplying power to the wireless communication module; and
   if the first detection mode detects that the wireless communication module is not transmitting data, then stopping supplying power to the wireless communication module via the control software.

4. The method of claim 1 wherein, after the detection mode has determined that the wireless communication module has stopped transmitting data, the control software controlling the power supply status of the wireless communication module, which comprises the following steps:
   when the second detection mode detects that the wireless communication module does not transmit data during the first time period, then supplying power to the wireless communication module via the control software, thereby the wireless communication module being capable of detecting and searching available channels within certain ranges; and
   detecting whether the wireless communication module does not transmit data during a second time period by using the second detection mode;
   when the second detection mode detects that the wireless communication module does not transmit data during the second time period, then stop supplying power to the wireless communication module by using the control software.

5. The method of claim 4, wherein the second detection mode detects that the wireless communication module has performed data transmission during the second time period, the control software will perform according to the first detection mode.

* * * * *